US011429787B2

United States Patent
Li et al.

(10) Patent No.: US 11,429,787 B2
(45) Date of Patent: *Aug. 30, 2022

(54) METHOD AND SYSTEM OF UTILIZING UNSUPERVISED LEARNING TO IMPROVE TEXT TO CONTENT SUGGESTIONS

(71) Applicant: MICROSOFT TECHNOLOGY LICENSING, LLC, Redmond, WA (US)

(72) Inventors: Ji Li, San Jose, CA (US); Xingxing Zhang, Beijing (CN); Furu Wei, Beijing (CN); Ming Zhou, Beijing (CN); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

This patent is subject to a terminal disclaimer.

(21) Appl. No.: 16/490,456

(22) PCT Filed: May 1, 2019

(86) PCT No.: PCT/CN2019/085397
§ 371 (c)(1),
(2) Date: Aug. 30, 2019

(87) PCT Pub. No.: WO2020/220370
PCT Pub. Date: Nov. 5, 2020

(65) Prior Publication Data
US 2021/0334708 A1    Oct. 28, 2021

(51) Int. Cl.
*G06F 40/274* (2020.01)
*G06N 20/20* (2019.01)
*G06F 40/40* (2020.01)

(52) U.S. Cl.
CPC ............ *G06F 40/274* (2020.01); *G06F 40/40* (2020.01); *G06N 20/20* (2019.01)

(58) Field of Classification Search
None
See application file for complete search history.

(56) References Cited

U.S. PATENT DOCUMENTS 7,546,235 B2    7/2009  Brockett et al.
9,367,763 B1 *  6/2016  Gordo Soldevila ... G06K 9/325
(Continued)

FOREIGN PATENT DOCUMENTS

CN    108875072 A    11/2018
CN    109614488 A    4/2019
CN    109684478 A    4/2019

OTHER PUBLICATIONS

Radford, Alec, et al. "Improving language understanding by generative pre-training." (2018). (Year: 2018).*
(Continued)

*Primary Examiner* — Douglas Godbold
(74) *Attorney, Agent, or Firm* — NovoTechIP International PLLC

(57) ABSTRACT

Method and system for training a text-to-content suggestion ML model include accessing a dataset containing unlabeled training data collected from an application, the unlabeled training data being collected under user privacy constraints, applying an ML model to the dataset to generate a pretrained embedding, and applying a supervised ML model to a labeled dataset to train the text-to-content suggestion ML model utilized by the application by utilizing the pretrained embedding generated by the supervised ML model.

20 Claims, 8 Drawing Sheets

(56) References Cited

U.S. PATENT DOCUMENTS

| | | | |
|---|---|---|---|
| 10,445,356 B1* | 10/2019 | Mugan | G06F 40/30 |
| 2016/0335493 A1 | 11/2016 | Zheng et al. | |
| 2016/0350655 A1* | 12/2016 | Weiss | G06F 40/35 |
| 2017/0139569 A1 | 5/2017 | Della Corte et al. | |
| 2018/0225281 A1* | 8/2018 | Song | G06F 40/30 |
| 2019/0122655 A1* | 4/2019 | Min | G06N 3/0454 |
| 2020/0258498 A1* | 8/2020 | Reisswig | G10L 15/183 |
| 2020/0364303 A1* | 11/2020 | Liu | G06N 3/0454 |
| 2020/0410157 A1* | 12/2020 | van de Kerkhof | G06F 40/30 |
| 2021/0134274 A1* | 5/2021 | Lee | G10L 15/02 |
| 2021/0182077 A1* | 6/2021 | Chen | G06F 9/30181 |
| 2021/0334457 A1 | 10/2021 | Zhang et al. | |

OTHER PUBLICATIONS

Devlin, Jacob, et al. "Bert: Pre-training of deep bidirectional transformers for language understanding." arXiv preprint arXiv: 1810.04805 (2018). (Year: 2018).*

Freitag, Markus, and Scott Roy. "Unsupervised natural language generation with denoising autoencoders." arXiv preprint arXiv: 1804.07899 (2018). (Year: 2018).*

"International Search Report & Written Opinion issued in PCT Application No. PCT/CN19/085397", dated Jan. 19, 2020, 9 pages.

"International Search Report & Written Opinion issued in PCT Application No. PCT/CN19/085396", dated Feb. 20, 2020, 9 pages.

Sun, et al., "ERNIE: Enhanced Representation through Knowledge Integration", In Journal of arXiv preprint arXiv:1904.09223v1, Apr. 19, 2019, 8 Pages.

Glorot, et al., "Deep Sparse Rectifier Neural Networks", In Proceedings of the Fourteenth International Conference on Artificial Intelligence and Statistics, Apr. 11, 2011, pp. 315-323.

Pennington, et al., "GloVe: Global Vectors for Word Representation", In the Proceedings of the Empirical Methods in Natural Language Processing, Oct. 25, 2014, 12 Pages.

"Non Final Office Action Issued in U.S. Appl. No. 16/490,440", dated Nov. 5, 2021, 18 Pages.

"Final Office Action Issued in U.S. Appl. No. 16/490,440", dated Feb. 17, 2022, 14 Pages.

"Notice of Allowance Issued in U.S. Appl. No. 16/490,440", dated Apr. 29, 2022, 10 Pages.

* cited by examiner

METHOD AND SYSTEM OF UTILIZING UNSUPERVISED LEARNING TO IMPROVE TEXT TO CONTENT SUGGESTIONS

RELATED APPLICATIONS

This application is a 35 U.S.C. 371 application claiming priority to co-pending International Application No. PCT/CN2019/085397, filed May 1, 2019, the disclosure of which is incorporated by reference in its entity.

BACKGROUND

Intelligent text-to-content suggestion services are used in a variety of computer programs. For example, text-to-content suggestion services may be used to suggest images, icons, or emoticons based on text received as an input in an application. In general, such applications may need to be compliant with certain privacy and data regulations. As a result, the applications may not be able to store and utilize users' data as entered. Instead, they may utilize mechanisms such as masking certain words and not keeping the original sentence order of input text to ensure privacy. This makes it difficult to correctly make text-to-content suggestions.

Furthermore, new content is often provided to applications that offer text-to-content suggestions. Because the process of labeling new content is often time consuming and expensive, some of the new content may be unlabeled. In general, the more labeled data a model includes, the better the quality of suggestions provided by the process. For example, when new unlabeled content is added to text-to-content service, the chance of the new data being provided as suggestions is lower than with the old data. This could mean that even though new content is added to a service, the users may not be presented with the new content for a long time.

Hence, there is a need for improved systems and methods of intelligently training text-to-content suggestion models.

SUMMARY

In one general aspect, this disclosure presents a device having a processor and a memory in communication with the processor wherein the memory stores executable instructions that, when executed by the processor, cause the device to perform multiple functions. The function may include accessing a dataset containing unlabeled training data collected from an application, the unlabeled training data being collected under user privacy constraints, applying an unsupervised machine-learning (ML) model to the dataset to generate a pretrained embedding, and applying a supervised ML model to a labeled dataset to train a text-to-content suggestion ML model utilized by the application. The supervised ML model may utilize the pretrained embedding generated by the supervised ML model to train the text-to-content suggestion ML model.

In yet another general aspect, the instant application describes a method for training a text-to-content suggestion ML model. The method may include accessing a dataset containing unlabeled training data collected from an application, the unlabeled training data being collected under user privacy constraints, applying an unsupervised machine-learning (ML) model to the dataset to generate a pretrained embedding, and applying a supervised ML model to a labeled dataset to train a text-to-content suggestion ML model utilized by the application. The supervised ML model may utilize the pretrained embedding generated by the supervised ML model to train the text-to-content suggestion ML mode.

In a further general aspect, the instant application describes a non-transitory computer readable medium on which are stored instructions that when executed cause a programmable device to access a dataset containing unlabeled training data collected from an application, the unlabeled training data being collected under user privacy constraints, apply an unsupervised machine-learning (ML) model to the dataset to generate a pretrained embedding, and apply a supervised ML model to a labeled dataset to train a text-to-content suggestion ML model utilized by the application. The supervised ML model may utilize the pretrained embedding generated by the supervised ML model to train the text-to-content suggestion ML model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
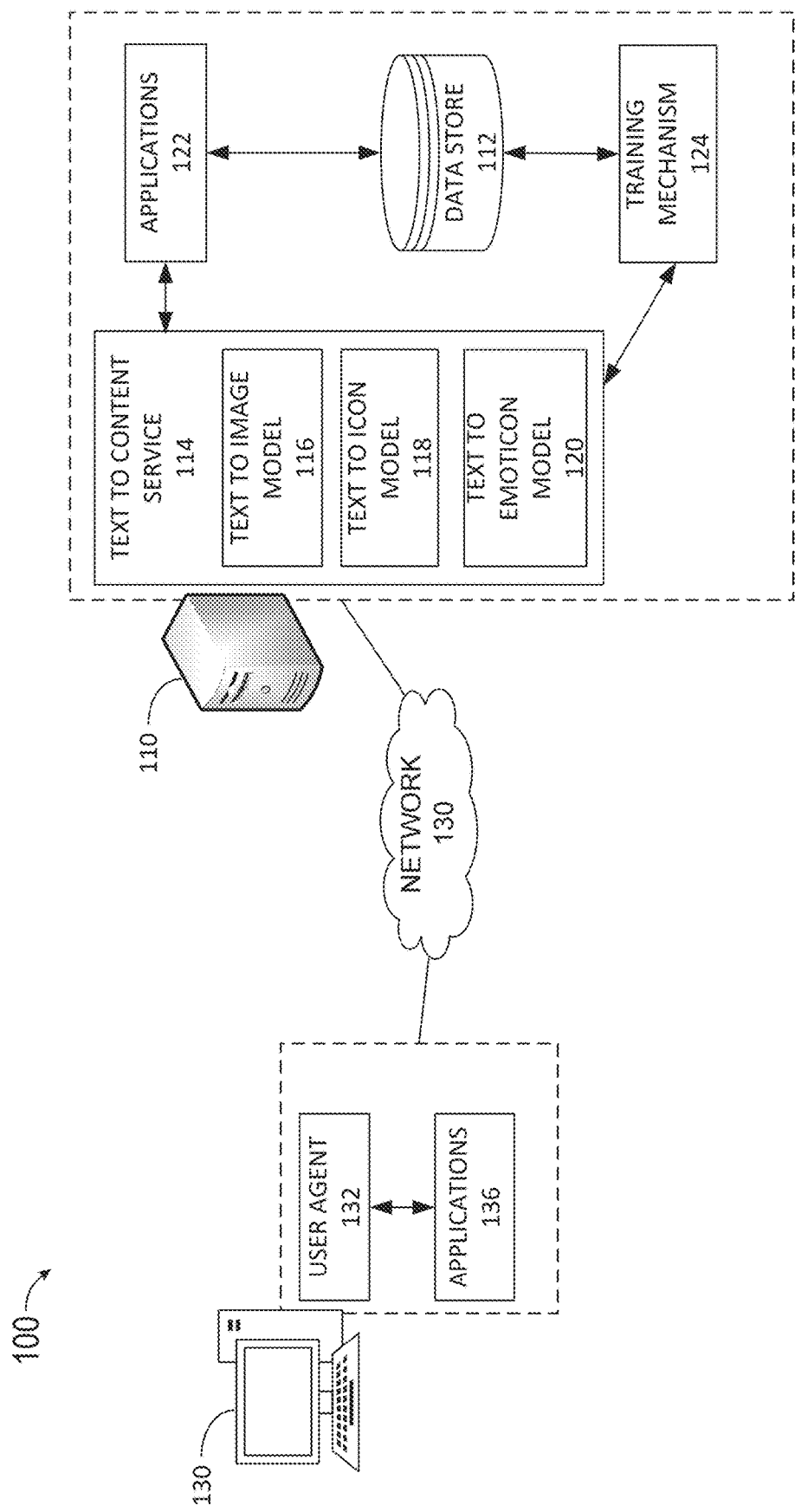
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

A number of applications commonly employed by a typical computer user may include content in addition to text that may be used to enter data in the application. New content is often being added to these applications and each may include a significant number of different content such as images, icons, emoticons, and the like. As a result, it is often difficult and time consuming for users to look through numerous content to find those that relate to the document the user is working on. Because of this, users may often forgo including such content in their documents. However, the additional content may play an important role in document creation. For example, a presentation that includes content such as icons and images may convey the message more clearly and may be more attractive and presentable.

Text-to-content services may provide an easy way for users to choose content (e.g., images, icons, emoticon, or keywords) that correspond to the entered text by presenting a list of suggestions to the user based on the user's input text. However, training models to correctly provide text-to-content suggestions may often be difficult because the training set may be partially filtered to ensure the user's privacy. Furthermore, during training data collection, in each slide in a presentation, only unigrams (e.g., words) within a fixed vocabulary maybe logged. Still further, words in a sentence may be shuffled to ensure the original text cannot be recovered. However, most currently used text analysis algorithms are based on ordered sentences and data that includes the correct text sequence. These algorithms may not work without a correct text sequence.

To make matters more complex, new content (e.g., icons, images, or emoticons) may be introduced frequently in a given application. When new content is provided, text-to-content models used in the service may need to be retrained to ensure the content is included in the suggestions. However, because the new content is often not sufficiently labeled, while the old content is labeled, training the text-to-content models on this unbalanced dataset with a traditional approach can lead to a model that rarely predicts new content.

A text-to-content service often hosts several models that each suggest certain type of content based on user's text input, such as text-to-image, text-to-icon, and text-to-emoticon. Traditionally, each of these models utilize their own approach to train the model. For example, some use the fastText classifier, while others use a tree-based model, or a combination of models. The models may use a known pretrained word embedding to transfer the input text to embedding, and then optimize the model using their own labeled data through iterations. This approach is not scalable when new content is often added for each model. Furthermore, the individual models may face an imbalanced data problem, as some models may have a significant amount of labeled data, whereas some others do not. In general, the more labeled data is available, the better quality of suggestions presented. As a result, having unbalanced labeled data may lead to imbalanced content suggestions. For instance, the text-to-image model may have the best quality because it may have abundant labeled data. The text-to-icon model, on the other hand, is may not be able to provide good quality suggestions due to limited labeled data.

To address these issues and more, in an example, this description provides techniques used for intelligently suggesting content based on input text by utilizing a deep neural network model. In an example, the deep neural network may include a first layer that is an average pooling layer and a second layer that is a fully connected layer. This deep neural network model may be trained using supervised training by utilizing a dataset that includes the new content and the old content. However, to ensure that suggestion accuracy is increased, the model may be pretrained via an unsupervised pretraining mechanism that uses large scale unlabeled data. The large-scale unlabeled data may include application domain specific data received via the application and external data. The domain specific data may mask certain words and include unordered sentences. The unsupervised pretraining mechanism may be used to predict the mask words and pretrain the first and second layers of the deep neural network model before the deep neural network model is trained for suggesting content. The unsupervised learning technique may be used to generate several sets of domain-specific pretrained word embeddings (e.g., size 100, 300, 500, 1000, and the like) for the text-to-content service. These word embeddings may incorporate the domain-specific knowledge of all the user texts in the service. Then each text-to-content task may choose the right set of domain-specific pretrained word embedding based on its available labeled data, target accuracy, and resource constraints. As a result, the solution provides an improved method of training text-to-content models to increase accuracy and efficiency.

As will be understood by persons of skill in the art upon reading this disclosure, benefits and advantages provided by such implementations can include, but are not limited to, a solution to the technical problems of inefficient training and providing inaccurate and unbalanced text-to-content suggestions. Technical solutions and implementations provided here optimize the process of training text-to-content models, increase accuracy in the content suggested and ensure that new content is included in suggested content. The benefits provided by these solutions provide more user-friendly applications, increase accuracy and increase system and user efficiency.

As a general matter, the methods and systems described herein may include, or otherwise make use of, a machine-trained model to identify contents related to a text. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or identify suggested contents that relate to a text entered by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112 which may function as a repository in which datasets relating to training models may be stored. The server 110 may operate as a shared resource server located at an enterprise accessible by various computer client devices such as client device 130. The server may also operate as a cloud-based server for offering text-to-content services in one or more applications such as applications 122.

The server 110 may include and/or execute a text-to-content service 114 which may provide intelligent text-to-content suggestions for a group of users utilizing applications on their client devices such as client device 130. The text-to-content service 114 may operate to examine data entered by a user via an application (e.g., applications 122 or applications 136), and suggest content corresponding to the entered data by utilizing various models. In an example, the text-to-content service 114 may utilize a text-to-image model 116, a text-to-icon model 118, and a text-to-emoticon model 120 to suggestion corresponding content. For example, the text-to-image model may be used to find images that correspond to the user's data in an application. Similarly, the text-to-icon model may be utilized to provide suggested icons that correspond to the entered data, and the text-to-emoticon model may be used to find emoticons that relate to the entered data. Other models may also be used. For example, a text-to-content service may include a text-to-keyword model that suggests keywords that correspond to entered text.

Each of the models used as part of the text-to-content service may be trained by a training mechanism 124. The training mechanism 124 may use training datasets stored in the datastore 112 to provide and ongoing initial training for each of the models 116, 118 and 120. In one implementation, the training mechanism 124 may use unlabeled training data from the datastore 112 (e.g., stored user input data) to train each of the models 116, 118 and 120, via deep neural networks models. The initial training may be performed in an offline stage.

The client device 130 may be connected to the server 110 via a network 130. The network 110 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 7 and 8.

The client device 130 may include one or more applications 136. Each application 136 may be a computer program executed on the client device that configures the device to be responsive to user input to allow a user to interactively enter data into applications 136. Examples of suitable applications include, but are not limited to, a word processing application, a presentation application, a note taking application, and a communications application.

In some examples, applications used to receive user input and provide content suggestion in response may be executed on the server 110 (e.g., applications 122) and be provided via an online service. In one implementation, web applications may communicate via the network 130 with a user agent 132, such as a browser, executing on the client device 130. The user agent 132 may provide a user interface that allows the user to interact with applications 122 and may enable applications 122 to provide user data to the datastore 112 to be stored as used as training data. In other examples, applications used to receive user input and provide content suggestions maybe local applications such as the applications 136 that are stored and executed on the client device 130 and provide a user interface that allows the user to interact with application. User data from applications 136 may also be provided via the network 130 to the datastore 112 for use by the training mechanism 124.

Figure 2:
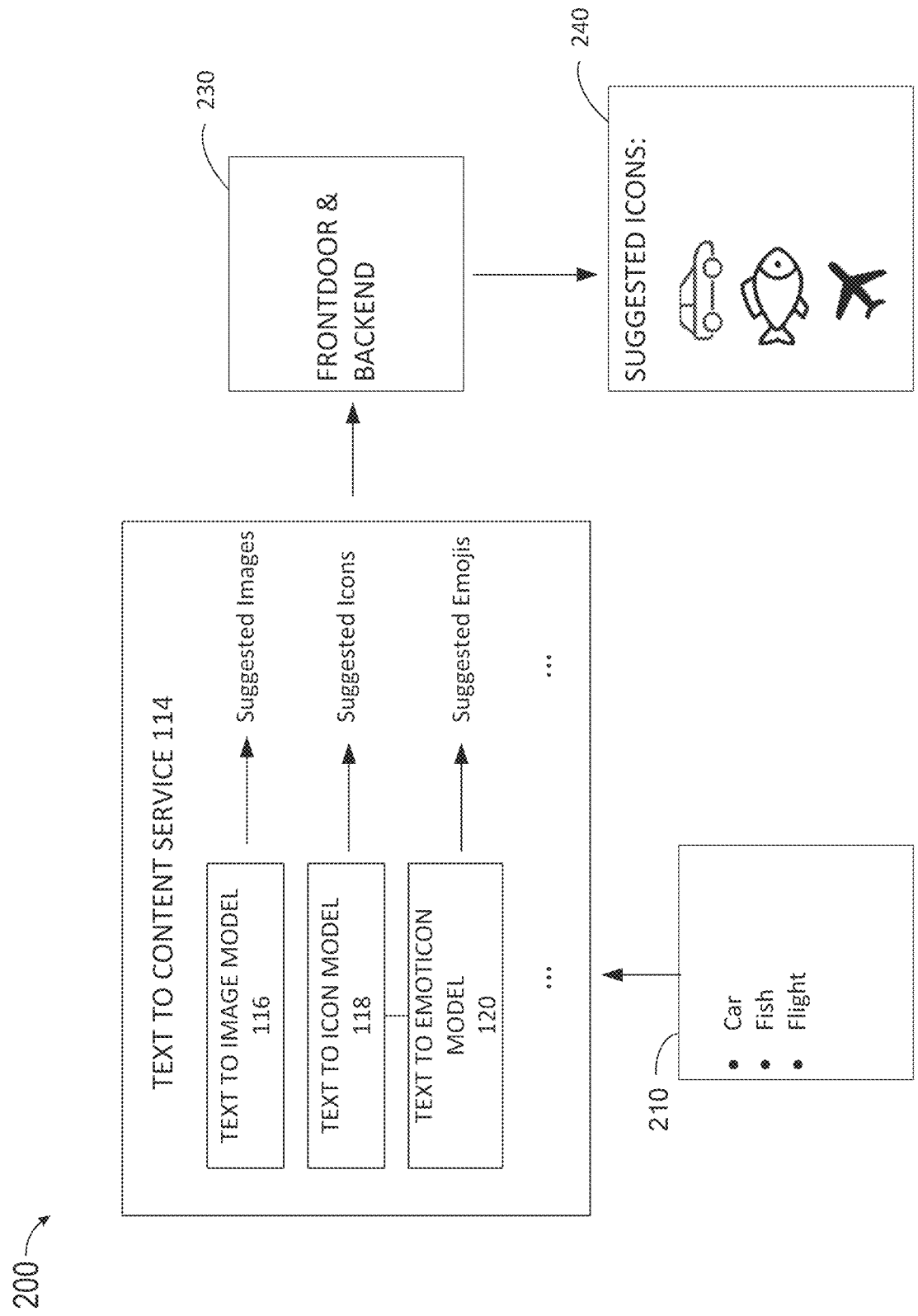
FIG. 2 depicts a simplified example system for providing content suggestions in an application.

FIG. 2 illustrates a simplified example system 200 for providing content suggestions in an application. In one implementation, the application may receive user input via a user interface 210. The entered input may be a portion of text entered on a page (e.g., one slide of the presentation or a page of a word document) of the application. The input data may comprise a single word or any practical number of words, from which feature data may be extracted and input to the text to content service 114 which uses the trained models 116, 118 and 120 to provide suggested images, suggested icons, suggested emoticons and the like. The text to content service may be provided by a remote server. Alternatively, a limited trained model may be available locally to the application to provide some suggested content, while offline, for example.

The suggested icons may be processed by a frontdoor and backend unit 220 which may handle the layout and prioritization of the suggested content when it is presented to the user in a user interface element such as user interface element 240. In one implementation, each of the trained models 116, 118 and 120 may assign a score to each suggested content (e.g., each suggested icon) based on the input text and the top ranked suggested content may be presented to the user. Thus, once a user enters a set of data in the application, highly related content may be presented to the user for easy selection.

Figure 3:
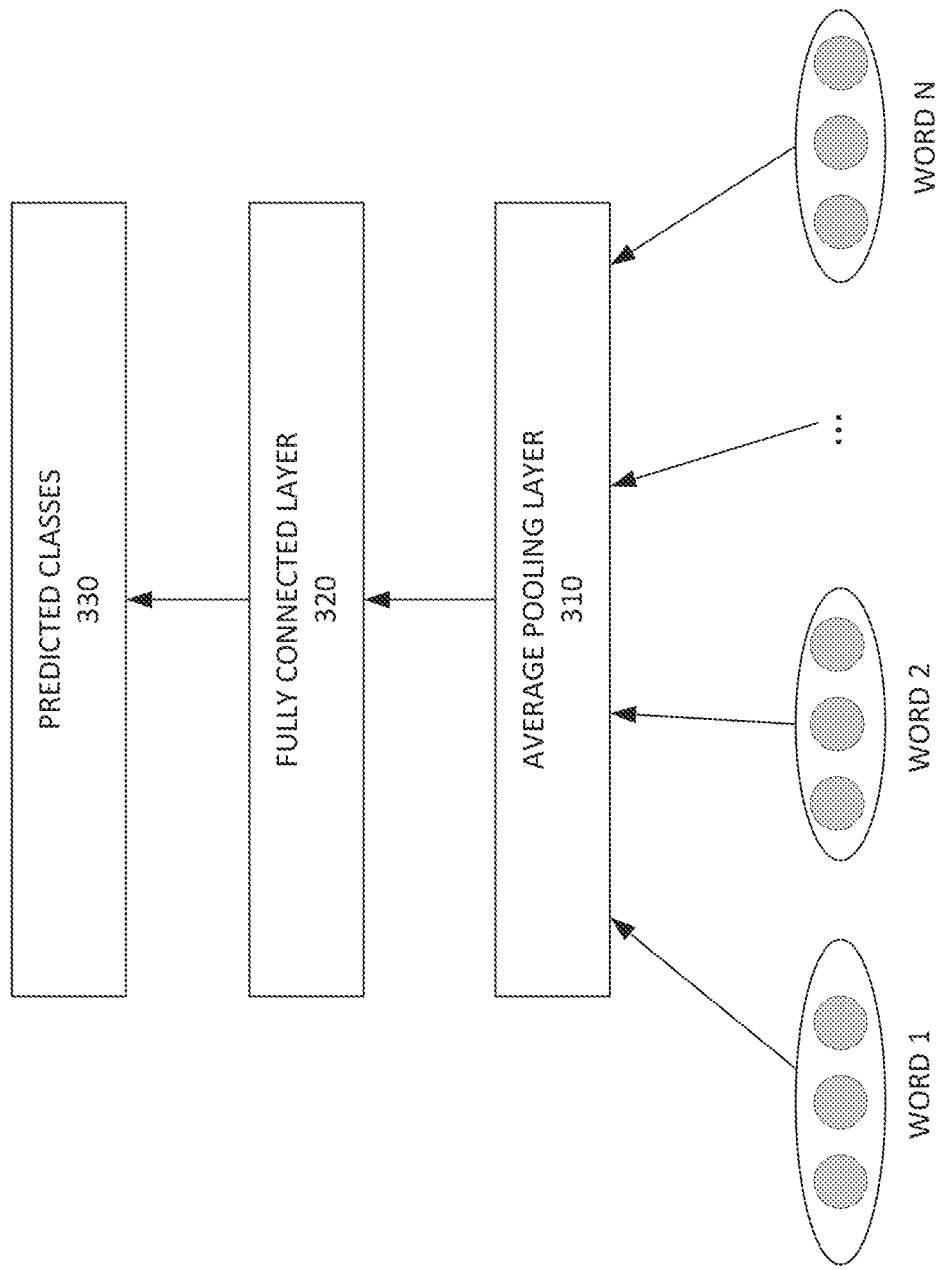
FIG. 3 is an example model architecture for a text-to-content model.

FIG. 3 depicts an example simplified architecture 300 for a text-to-content suggestion model. In one implementation, the text-to-content suggestion model is a deep neural network having two layers. In an example, the input of the text-to-content suggestion model may be a portion of text referred to as a query. As shown in FIG. 3, an example query of the input dataset may include word 1 through word n. A query may be a set of words derived from a page of an application (e.g., a slide in a presentation or a page of a word document) that provides a text-to-content service.

The query may be entered as input into the text-to-content model and used to derive an average pooling layer 310 of the sentence(s) from which the query originated. This may be done by calculating a value for the average of word embeddings in the query. Assuming a given query is denoted by Q and represented as Q=($w_1$, $w_2$, . . . , $w_n$), and the word embedding matrix is denoted by $W_E$, the average of word embeddings in Q may be denoted by q and calculated as follows:

$$q = \frac{1}{n}\sum_i W_E e(w_i) \quad (1)$$

In the above equation (1), $w_i$ may denote the one hot encoding vector. As is known in the art, the one hot encoding vector may be used to perform binarization of the matrix to properly train a model.

The word embedding matrix $W_E$ may be learned on the fly or may be initialized with one or more known pretrained word embeddings. In one implementation, the word embedding matrix may be initialized with pretrained word embeddings such as Global Vectors for Word Representation (GloVe), Word2vec, or fastText. As is known in art, Glove is an unsupervised learning algorithm for obtaining vector representations for words. Training in GloVe may be performed on aggregated global word to word cooccurrence statistics from a corpus, and the resulting representations may showcase linear substructures of the word vector space. Word2vec refers to a group of related neural network models that are trained to reconstruct linguistic contexts of words. Similarly, fastText is a library of word embeddings created for obtaining vector representation of words. In an example, fastText provides a 300-dimension vector representation of words.

Once the average of word embeddings in Q is calculated, an average pooling layer 310 for the sentence(s) from which the input text (e.g. query) originated may be generated. A fully connected layer 320 may then be developed for the query. As is known in the art, a fully connected layer in a neural network connects every neuron in one layer of the model to every neuron in another layer. The size of the fully connected layer 320 may depend on the complexity of the task. In an example, the size may vary from 500 to 1000. In one implementation, the fully connected layer 320 may have an activation function such as a rectified linear unit (ReLU) activated upon it. This may be done by using the following function:

$$h = \max(0, Wq+b) \quad (2)$$

In equation (2), h may denote the hidden layer output and b may denote the bias in the hidden layer. Additionally, a dropout procedure may be used to reduce overfitting in the model by preventing complex co-adaptations on the training data. ReLU and Dropout are known mechanism the details of which are readily available in the art.

Once the fully connected neural network layer 320 is generated and any desired functions applied upon it, a probability distribution may be calculated over all the content available (e.g., all icons available for suggestion) to predict the correct icons for the query. This may be calculated using the following equation:

$$p(y_i|Q) = \text{softmax}(h) \quad (3)$$

In the above equation (3), $p(y_i|Q)$ may denote the probability distribution and $y_i$ may denote the probability of the ith icon. In this manner, icons that are most likely to be associated with the query (e.g., the text in the document) may be predicted as predicted classes 330. These icons may be suggested to the user via a user interface.

Figure 4:
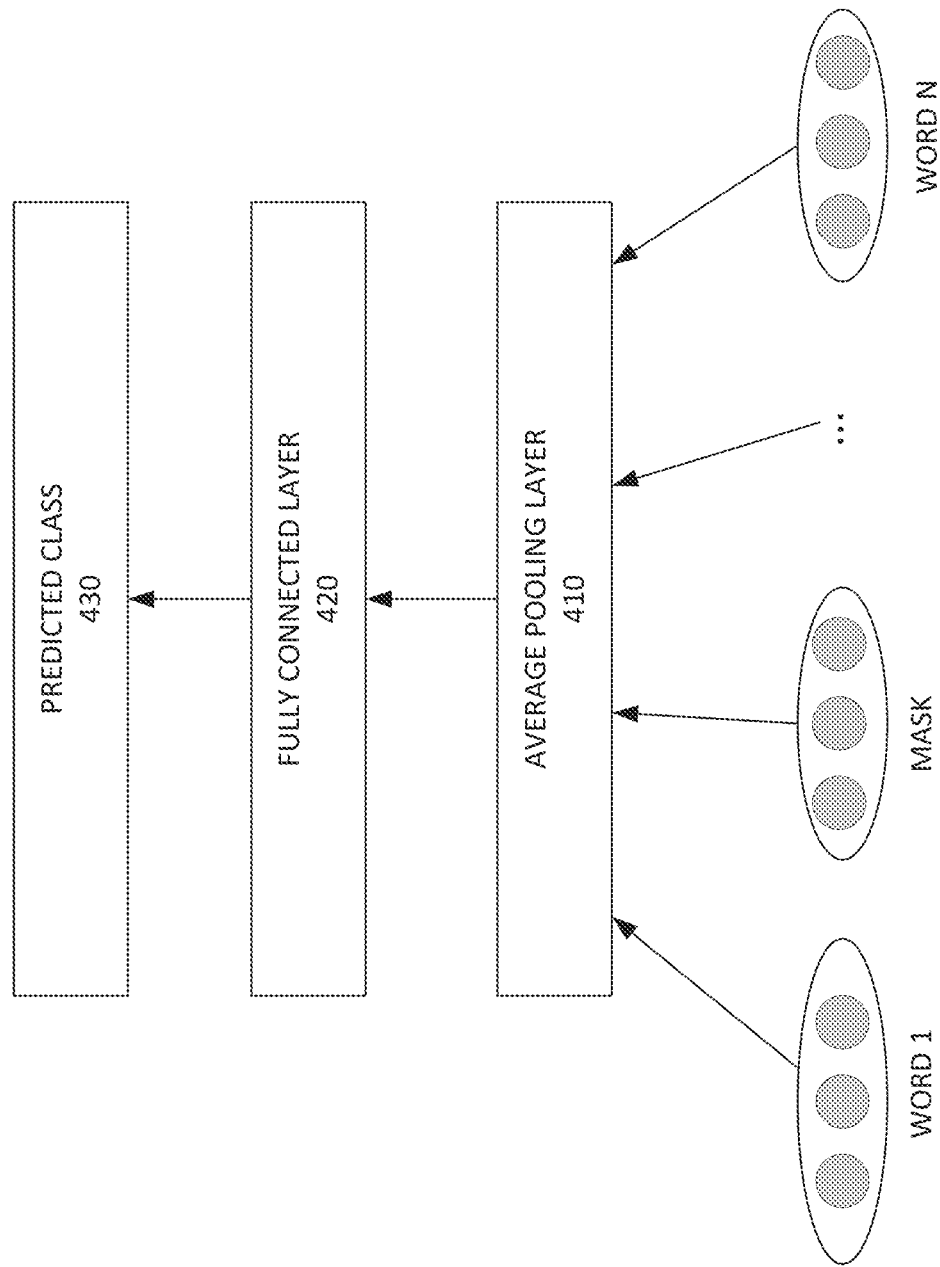
FIG. 4 is an example model architecture for an unsupervised learning model for pretraining embeddings used in the model architecture of FIG. 3.

To properly train the text-to-content model, a combination of unsupervised and supervised learning models may be used. FIG. 4 depicts an example simplified architecture 400 for an unsupervised learning model used to pretrain text-to-content suggestion models. In one implementation, the unsupervised learning model is a deep neural network, in which the deep network is trained to have an embeddings layer corresponding to at least one of words, or sentences. As will be understood, deep neural networks may be trained to obtain unstructured text embeddings. These embeddings may provide the basis for supervised learning. The embeddings layer may be learned from an unlabeled dataset. In an example, the dataset may be a dataset of unlabeled stored user data obtained via the application over a period of time. Thus, the dataset may be a set of domain specific unlabeled data which has domain knowledge of the application. As discussed above, to ensure privacy, stored user data may not include all the words included in the original input text. For example, a filtering method may be used to filter out certain words. Furthermore, not all words in user input can be logged because of constrains on the size of the dictionary used in the training algorithm. In an example, about 30% of words in a sentence may be randomly masked. Additionally, words in a sentence may be shuffled to change their order and thus make it harder to infer the original user input. Thus, the dataset may include an unordered set of words some of which may be masked. As shown in FIG. 4, an example query of the input dataset may include word 1 through word n, with n being the length of the query, and with some of the words being masked. One advantage of using an unlabeled dataset is that the vocabulary size can be increased by using an external dataset (e.g., English Gigaword dataset).

The unlabeled dataset then may be used to derive the average pooling layer 310 of the model architecture for the query. This may be done by calculating a value for the average of word embeddings in the query. The query may be denoted as $\hat{Q}$ and represented as $\hat{Q}=(w_1, [\text{mask}], \ldots, w_n)$ when $w_2$ is masked. In this case $w_2$ may be replaced with a special token. The query $\hat{Q}$ may then be used to infer $w_2$ by first determining a word embedding matrix denoted by $W_E$. As discussed above, the word embedding matrix may be initialized with one or more known pretrained word embeddings such as GloVe, Word2vec, or fastText.

Once the word embedding matrix $W_E$ has been initialized, the representation of the query $\hat{Q}$, which may be denoted by $\hat{q}$, and may be the average of word embeddings for $\hat{Q}$ may be calculated as follows:

$$\hat{q} = \frac{1}{n}\sum_i W_E e(w_i) \quad (4)$$

The average pooling layer 410 for the sentence(s) from which the query originated may then be generated. Furthermore, once the average pooling layer 410 is generated, a fully connected layer 420 may be developed based on $\hat{q}$. As discussed above, the fully connected layer 420 may have an activation function such as a rectified linear unit (ReLU) activated upon it and a dropout mechanism may be applied to reduce overfitting in the model. Then a probability distribution may be calculated over all the words in the dataset to predict the unmasked word(s) in the query. This may be calculated using the following equation:

$$p(y_i|\hat{Q}) = \text{softmax}(h) \quad (5)$$

In equation (5), $p(y_i|Q)$ may denote the probability distribution and $y_i$ may denote the probability of the ith word being the masked word. In this manner, the masked word may be predicted in as part of a predicted class 430. In this manner, the unsupervised learning model may function similarly to an autoencoder.

In an implementation, the unsupervised training model may continue running to process all the data in the unlabeled dataset. The dataset may include a significant number of queries. In an example the dataset may include tens of thousands of queries and the unsupervised training model may require a few days to train. Once the dataset is processed via the algorithm, an embedding layer may be generated which may be used further as a pretrained embedding layer to train the text-to-content models. The pretrained embedding layer may function as a dictionary of embedding specifically tailored to data in the application from which the input dataset was derived. Once the unsupervised learning model 400 is completed, the resulting pretrained embedding generated as part of the process may be used to train one or more text-to-content models. For example, the pretrained embedding layer may be used to train all text-to-content models provided in a text-to-content service.

Figure 5:
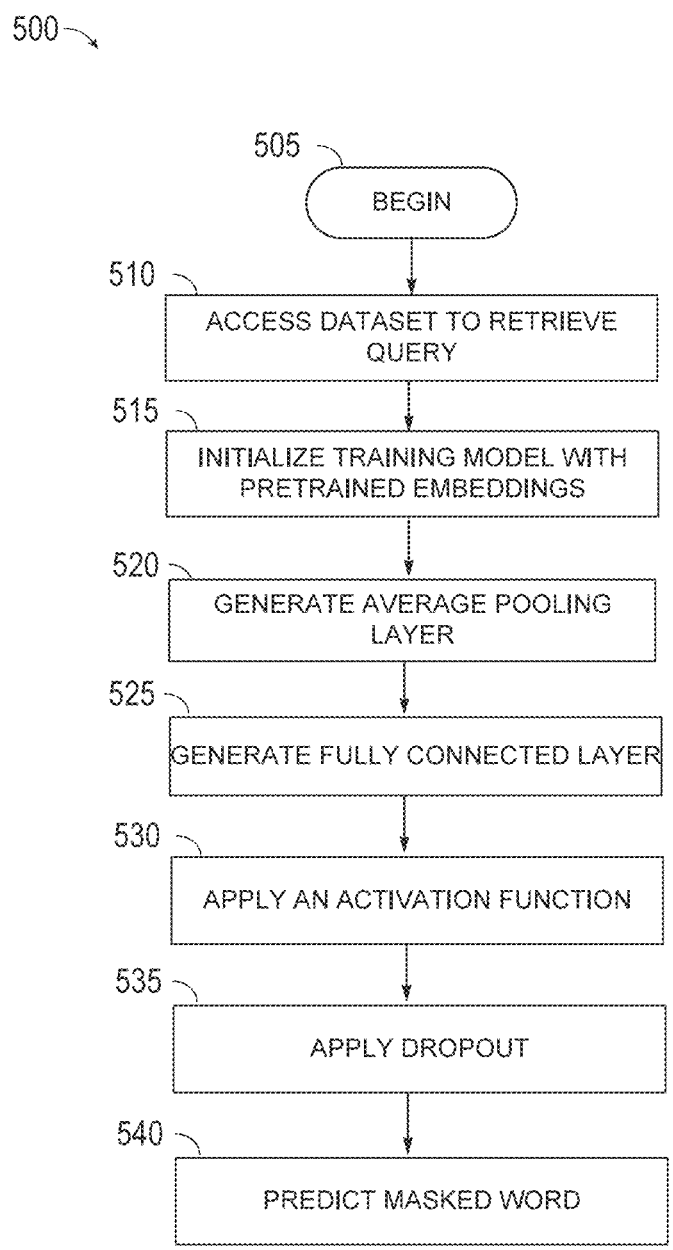
FIG. 5 is a flow diagram depicting an example method for providing an unsupervised learning model to predict masked words in an unordered dataset and to pretraining an embeddings layer.

FIG. 5 is a flow diagram depicting an exemplary method 500 for providing unsupervised learning model to predict masked words in an unordered dataset. The method 500 may begin, at 505, and proceed to access a dataset, at 510. As discussed above, the dataset may be an application specific dataset based on user data received from the application and logged in a dataset designed for use in by a training mechanism. This database may be a large-scale dataset that includes unordered queries containing masked words. The size of the dataset may be determined by the size constraints of the dictionary designed for the training algorithm and may vary depending on the application. To train the model, method 500 may process all queries in the dataset.

After accessing the dataset to retrieve a query, method 500 may proceed to initialize the training model with one or more general pretrained embeddings, at 515. The general pretrained embeddings may be industry standard pretrained embeddings that use dictionary words as their inputs. These pretrained embeddings may be different by the pretrained embeddings generated by the unsupervised training model disclosed herein in that the pretrained embeddings generated by the disclosed unsupervised training model are domain specific and trained with application specific data. Method 500 may utilize one or more pretrained embeddings to initialize a word embedding matrix for the query.

Once the training model is initialized with one or more pretrained embeddings, method 500 may proceed to generate an average pooling layer for the sentence(s) from which the query originated, at 520, before generating a fully connected layer, at 525. An activation function such as ReLU may then be applied to the fully connected layer, at 530. Method 500 may then proceed to apply a dropout mechanism to the fully connected layer, at 535, before the masked word can be predicted by the neural network, at 540. The steps of method 500 may be repeated for each query in the dataset to generate a predicted class.

During this unsupervised learning process a pretrained embedding is generated. The pretrained embedding is an application specific embedding that can be used for the entire text-to-content service to improve the quality of text-to-content models and share domain-specific knowledge across text-to-content models. In one implementation, a few sets of pretrained embedding layers each having a different dimension may be generated by the unsupervised learning algorithm. For example, a first embedding layer having vectors of 100 dimension may be generated. This may be useful for training algorithms that have a small size of training data and are thus relatively simple. A second pretrained embedding layer having vectors of 500 dimensions may be generated for training more complex model. A third set of pretrained embedding layer having vectors of 1000 dimensions may be created for training highly complex models. Each of the these embedding layers may have corresponding initialization weights which may be used in training downstream text-to-content models as discussed below.

Figure 6:
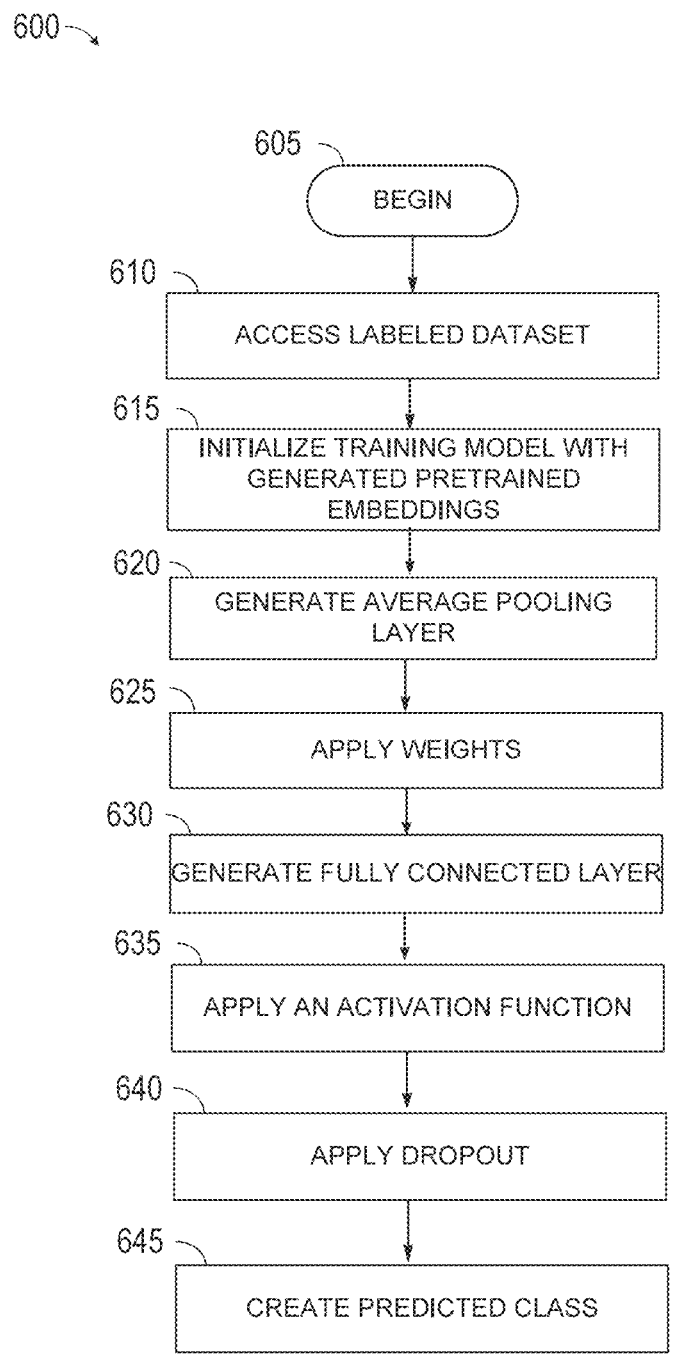
FIG. 6 is a flow diagram depicting an example method training a text-to-content suggestion model based.

FIG. 6 is a flow diagram depicting an example method 600 for training a text-to-content suggestion model based. The method 600 may begin, at 605, and proceed to access a training dataset, at 610. The dataset used at this stage may be a labeled dataset provided specifically for training a particular type of text-to-content suggestion model (e.g., text-to-icon, text-to-images, or text-to-emoticon). As such the training performed at this stage may be supervised learning. Depending on the type of training required (e.g., initial training or retraining due to new contents), the size of the dataset used may be relatively small and may depend on the type of model being trained.

After accessing the dataset to access a query, method 600 may proceed to initialize the training model with a pretrained embedding layer generated by the unsupervised learning model, at 615. The pretrained embedding layer most appropriate to the type of model being trained may be selected at this stage. Method 600 may utilize the pretrained embedding to initialize a word embedding matrix for the query.

Once the training model is initialized with the pretrained embeddings, method 600 may proceed to generate an average pooling layer for the sentence(s) from which the query originated, at 620, before applying initialization weights to the model, at 625. The initialization weights may be derived from the unsupervised learning model to initialize the text-to-content model being trained. Method 600 may then proceed to generate a fully connected layer, at 630. An activation function such as ReLU may then be applied to the fully connected layer, at 635. Method 600 may then proceed to apply a dropout mechanism to the fully connected layer, at 640, before the output predicted classes can be created, at 540.

The steps of method 600 may be repeated for each query in the dataset to generate a predicted class. In one implementation, random weights may be used between the fully connected layer and the output predicted class. The size of the predicted class may depend on the size of the contents available in the application. For example, if the application includes 800 icons that are available for the text-to-icons suggestion model, the size of the class created for this model may be 800. The steps of the method may be repeated to fine tune the model, each time using different weights to achieve at a final model. In this manner, the pretrained embedding layers generated by the unsupervised learning model can be used to train downstream tasks.

In one implementation, an engineering layer may be added to the final model to ensure that the model functions properly in an online environment. This is because during the testing a model may function differently than when in the real-world and an online environment because the signal may be hiding a number of other models and the like. The engineering layer can guide the suggestions. In particular, with respect to new content proportion, the engineering layer can tune the proportion of new contents presented as suggestions.

Other challenges in training text-to-content models may be presented when new content is added to an application. For example, the new content may not include labels and the new content may be promoted with much less data than old content. In general, when dealing with new content, it may be difficult to control the proportion of new content suggested by the models. To address these issues, the training models may utilize third party augmented datasets to bootstrap new contents. For example, Wikipedia and dictionary datasets may be used for this purpose. Other mechanisms may also be used. In an example, the training may include a dropoff mechanism which gradually removes old content in each batch of training data. This may result in gradual increase of the ratio of new content to old content in each batch. Another mechanism may be penalizing the error in new content more. Yet, another method that can be used to address these issues is creating a new model for new content and merging the results of the new model with the old model. This may involve making the merge logic controllable. As discussed before, an engineering layer may also be added to control new content output scores during online flight.

It should be noted that the models providing text-to-content suggestions may be hosted locally on the client (e.g., text-to-content engine) or remotely in the cloud (e.g., text-to-content service). In one implementation, some models are hosted locally, while others are stored in the cloud. This enables the client device to provide some suggestions even when the client is not connected to a network. Once the client connects to the network, however, the application may be able to provide better and more complete text-to-content suggestions.

Thus, methods and systems for generating an application-specific embedding for a text-to-content service is provided. The application-specific embedding may be used to train text-to-content models to improve the quality of the models, which may lack sufficient labeled data, and to share domain-specific knowledge across text-to-content models. The improved training method may utilize an unsupervised learning technique and open source pretrained word embeddings to generate various sets of domain-specific pretrained word embeddings for all text-to-content models in a text-to-content service. The domain-specific pretrained word embeddings may be shared among downstream text-to-content tasks through a united pretrained word embedding, in order to bootstrap new text-to-content suggestions and minimize differences in suggestion quality among different models. As a result of employing an unsupervised learning model first, far less labeled data may be needed to train each text-to-content model. Furthermore, the models generate better suggestions with the same amount of labeled data. This means the algorithms make efficient use of unlabeled data, and the time required to bootstrap decent quality text-to-content suggestions models can be decreased significantly. This can improve the user's overall experience, increase their efficiency, and assist in locating relevant contents more easily when needed.

Figure 7:
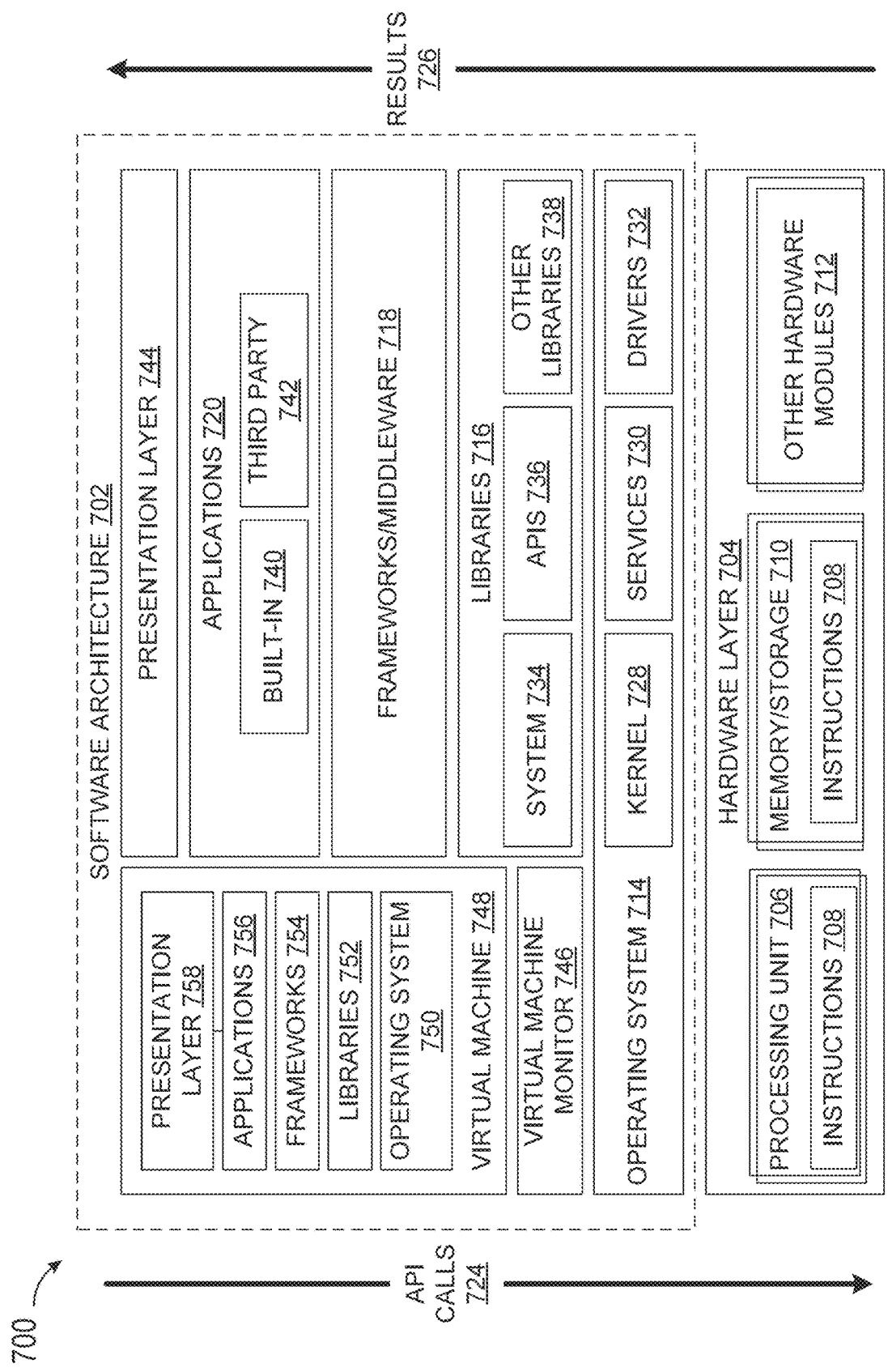
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 724. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 720 and/or third-party applications 722. Examples of built-in applications 720 may include, but are not limited to, a contacts application, a browser application, a location application, a media application, a messaging application, and/or a game application. Third-party applications 722 may include any applications developed by an entity other than the vendor of the particular system. The applications 720 may use functions available via OS 714, libraries 716, frameworks 718, and presentation layer 724 to create user interfaces to interact with users.

Some software architectures use virtual machines, as illustrated by a virtual machine 728. The virtual machine 728 provides an execution environment where applications/modules can execute as if they were executing on a hardware machine (such as the machine 800 of FIG. 8, for example). The virtual machine 728 may be hosted by a host OS (for example, OS 714) or hypervisor, and may have a virtual machine monitor 726 which manages operation of the virtual machine 728 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
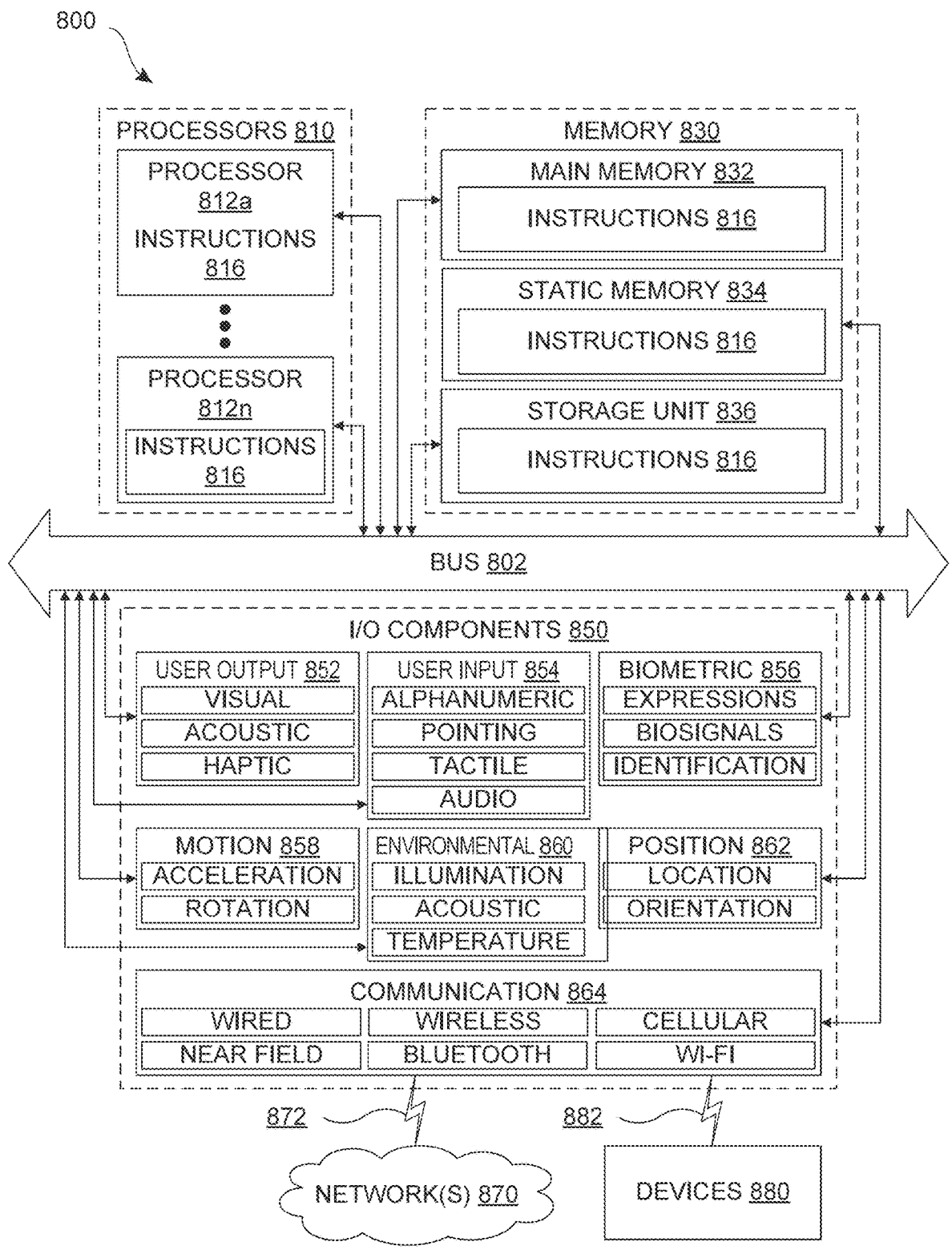
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 970 and/or device(s) 880 via respective communicative couplings 872 and 882. The communication components 964 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a memory in communication with the processor, the memory comprising executable instructions that, when executed by the processor, cause the data processing system to perform functions of:
    accessing a dataset containing unlabeled training data collected from users' use of an application that offers text-to-content suggestions by suggesting content in response to text queries;
    applying an unsupervised training process to the dataset to generate a plurality of pretrained embeddings; and
    utilizing the plurality of pretrained embeddings generated by the unsupervised training process in a supervised training process that uses a labeled dataset to train a text-to-content suggestion machine-learning (ML) model utilized by the application, the labeled dataset being smaller than the dataset containing unlabeled data.

2. The data processing system of claim 1, wherein each of the unsupervised and the supervised training processes includes an average pooling layer and a fully connected layer.

3. The data processing system of claim 1, wherein the instructions further cause the processor to apply initialization weights to the supervised training process, the initialization weights being obtained by the unsupervised training process.

4. The data processing system of claim 1, wherein the instructions further cause the processor to apply an engineering layer to the trained text-to-content suggestion ML model to control a proportion of new contents suggested.

5. The data processing system of claim 2, wherein the unlabeled training data is used to derive the average pooling layer.

6. The data processing system of claim 1, wherein:
    the training data includes an unordered set of words and the unordered set of words includes at least one masked word; and
    the unsupervised training process generates a predicted word corresponding to the masked word.

7. The data processing system of claim 1, wherein the unsupervised training process generates a plurality of pretrained embedding layers, each pretrained embedding layer having a different vector dimension for use with a different text-to-content suggestion model.

8. A method for training a text-to-content suggestion machine-learning (ML) model, the method comprising:
    accessing a dataset containing unlabeled training data collected from users' use of an application that offers text-to-content suggestions by suggesting content in response to text queries;
    applying an unsupervised training process to the dataset to generate a plurality of pretrained embeddings; and
    utilizing the plurality of pretrained embeddings generated by the unsupervised training process in a supervised training process that uses a labeled dataset to train the text-to-content suggestion ML model utilized by the application, the labeled dataset being smaller than the dataset containing unlabeled data.

9. The method of claim 8, wherein each of the unsupervised and the supervised training processes includes an average pooling layer and a fully connected layer.

10. The method of claim 8, further comprising applying initialization weights to the supervised training process, the initialization weights being obtained by the unsupervised training process.

11. The method of claim 8, further comprising applying an engineering layer to the trained text-to-content suggestion ML model to control a proportion of new contents suggested.

12. The method of claim 9, wherein the unlabeled training data is used to derive the average pooling layer.

13. The method of claim 8, wherein the unsupervised training process generates a plurality of pretrained embedding layers, each pretrained embedding layer having a different vector dimension for use with a different text-to-content suggestion model.

14. A non-transitory computer readable medium on which are stored instructions that, when executed, cause a programmable device to:
   access a dataset containing unlabeled training data collected from users' use of an application that offers text-to-content suggestions by suggesting content in response to text queries;
   apply an unsupervised training process to the dataset to generate a plurality of pretrained embeddings; and
   utilizing the plurality of pretrained embeddings generated by the unsupervised training process in a supervised training process that uses a labeled dataset to train a text-to-content suggestion machine-learning (ML) model utilized by the application, the labeled dataset being smaller than the dataset containing unlabeled data.

15. The non-transitory computer readable medium of claim 14, wherein each of the unsupervised and the supervised training processes includes an average pooling layer and a fully connected layer.

16. The non-transitory computer readable medium of claim 14, wherein the instructions further cause the programmable device to apply initialization weights to the supervised training process, the initialization weights being obtained by the unsupervised training process.

17. The non-transitory computer readable medium of claim 14, wherein the instructions further cause the programmable device to apply an engineering layer to the trained text-to-content suggestion ML model to control a proportion of new contents suggested.

18. The non-transitory computer readable medium of claim 15, wherein the unlabeled training data is used to derive the average pooling layer.

19. The non-transitory computer readable medium of claim 14, wherein:
   the training data includes an unordered set of words and the unordered set of words includes at least one masked word; and
   the unsupervised training process generates a predicted word corresponding to the masked word.

20. The non-transitory computer readable medium of claim 14, wherein the unsupervised training process generates a plurality of pretrained embedding layers, each pretrained embedding layer having a different vector dimension for use with a different text-to-content suggestion model.

* * * * *